United States Patent [19]
Hammer

[11] 3,993,103
[45] Nov. 23, 1976

[54] PIPE LINE EXPANSION PLUGS AND TOOLS

[75] Inventor: Victor Hammer, Berkeley Heights, N.J.

[73] Assignee: Inner-Tite (A Division of Yara Engineering Corporation), Springfield, N.J.

[22] Filed: Sept. 18, 1975

[21] Appl. No.: 614,704

[52] U.S. Cl. ............................................... 138/89
[51] Int. Cl.² ....................................... F16L 55/12
[58] Field of Search ............... 138/89; 220/233, 235; 294/116, 86.3; 81/98, 128; 85/9 R; 4/295

[56] References Cited
UNITED STATES PATENTS

| | | | |
|---|---|---|---|
| 409,014 | 8/1889 | Clark | 138/89 |
| 1,850,040 | 3/1932 | Turner | 138/89 |
| 1,895,827 | 1/1933 | Van Hecke | 138/89 X |
| 2,076,041 | 4/1937 | Payne | 85/9 R X |
| 2,153,702 | 5/1935 | Tighe | 85/9 R |
| 2,764,184 | 9/1956 | Fitzhugh et al. | 138/89 |
| 2,923,323 | 2/1960 | Franck | 138/89 |
| 2,993,616 | 7/1961 | Carlile et al. | 138/89 X |
| 3,093,402 | 6/1963 | Sisson | 294/116 X |
| 3,889,714 | 6/1975 | Wilger et al. | 138/89 |

Primary Examiner—Richard E. Aegerter
Assistant Examiner—James E. Bryant, III
Attorney, Agent, or Firm—Buell, Blenko & Ziesenheim

[57] ABSTRACT

An expandable pipe line plug and tool are provided having a flexible stopper plug normally capable of insertion axially into a pipe to be sealed and expandable into sealing engagement with said pipe, said plug having an expandable portion actuated by relative movement of a nut and a threaded bolt having a circular head and landed shoulder beneath the head and a tool having an outer hollow member adapted to engage the nut at one end and an inner member axially of the hollow member having gripping means adapted in one position to pass over the circular bolt head and in a second position to engage the bolt head and landed shoulder whereby relative rotation of the outer hollow member and inner member causes relative rotation of the nut and threaded bolt to expand and contract the expandable member.

5 Claims, 4 Drawing Figures

PIPE LINE EXPANSION PLUGS AND TOOLS

This invention relates to pipe line expansion plugs and particularly to plugs which are adapted for installation remote from an open end of such pipe line to prevent tampering by unauthorized persons.

Expandable plugs for use in closing pipe lines have been proposed in the past, however, they are generally of such form that they must be inserted near an open end of the pipe because of the necessity for drawing a pair of abutments together against an intermediate resilient member and are thus easily accessible for removal. Typical of such devices is that shown in Clark U.S. Pat. No. 409,014. On the other hand are those devices which are installed remote from the open end but yet are still readily removed by commercially available bar stock or with slight modification of such stock so that they are generally easily removed by one who wishes to abort the seal. For example, Franck U.S. Pat. No. 2,923,323, can be released using a hexagonal bar, the same is true of Turner U.S. Pat. No. 1,850,040. Fitzhugh et al. U.S. Pat. No. 2,764,184, can be released with a long bar having a T head or transverse pin. Thus the very purpose of inserting the plug can be subverted by unauthorized persons using readily available means.

The present invention provides a pipe line expansion plug which can be inserted and removed only by using a special tool. It eliminates the possibility of removal by any conventionally available devices and provides a secure seal for a pipe line.

This invention provides an expandable pipe line plug adapted for passage into and installation within an inaccessible part of a pipe by a single elongated tool comprising a pair of spaced apart ring members rotatable on a threaded shaft, a stop member on one end of said shaft abutting one of said ring members, a threaded nut on said shaft abutting the other of said ring members, a sleeve of deformable material between the two ring members adapted to expand radially into sealing relation with the pipe interior when the two ring members are moved axially together on the shaft, a circular head on said shaft opposite the stop, said elongated tool including an outer tube having an end socket adapted to engage the nut on the threaded shaft, an inner axial shaft within said tube, at least two grip fingers pivoted on the end of said shaft within the tube adapted to surround the circular head on the threaded shaft and engage grip members on the face of the head toward the stop member, a closure means on the outer tube adapted to bear on the grip fingers to hold them engaged with the grip members when the tube end socket engages the nut, handle means on the shaft and outer tube for relative rotation of one with respect to the other whereby the nut may be threaded on the shaft to move the ring members axially together to expand the deformable member or apart to relax the deformable member. The grip fingers may be pivoted in a groove on the shaft and held in position by a spring retainer or pin. The grip members are preferably four flats forming a square nut on the side of the head facing the stop member. The outer tube and inner shaft are preferably biased apart by resilient means such as a spring.

In the foregoing general description of this invention certain objects, purposes and advantages of the invention have been set out. Other objects, purposes and advantages of this invention will be apparent from the following description and the accompanying drawings in which.

Figure 1:
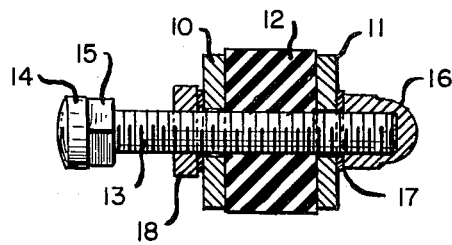
FIG. 1 is a section through a plug assembly according to this invention.

Referring to the drawings, a plug assembly is provided made up of a pair of spaced apart washers 10 and 11 with a rubber ring or donut 12 between them all on a threaded bolt 13 having a round head 14 and four lands 15 beneath the head similar to a carriage bolt. A stop 16 is provided on the end of bolt 13 in the form of a cap nut. A nylon washer 17 or similar anti-friction washer is provided to reduce the friction between stop 16 and washer 11 and to effect a gas tight seal. A nut 18 is threaded onto the bolt between head 14 and washer 10. Relative rotation of bolt 13 and nut 18 will move the washers 10 and 11 together compressing the rubber ring 12 causing it to expand radially into engagement with the interior of a pipe to be plugged.

Figure 2:
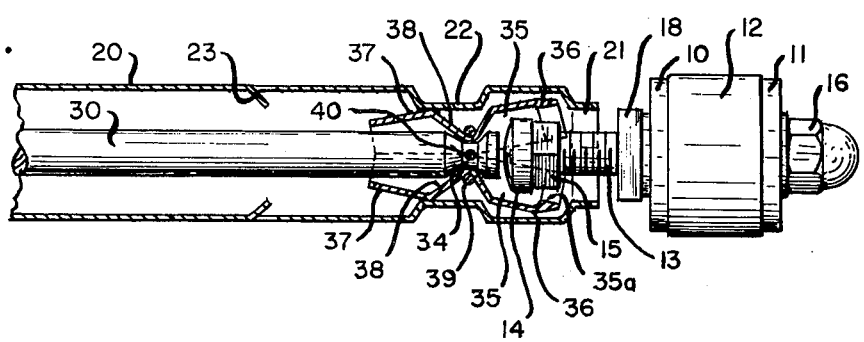
FIG. 2 is a section through the plug assembly and elongated tool in position for removing or applying the tool.
Figure 3:
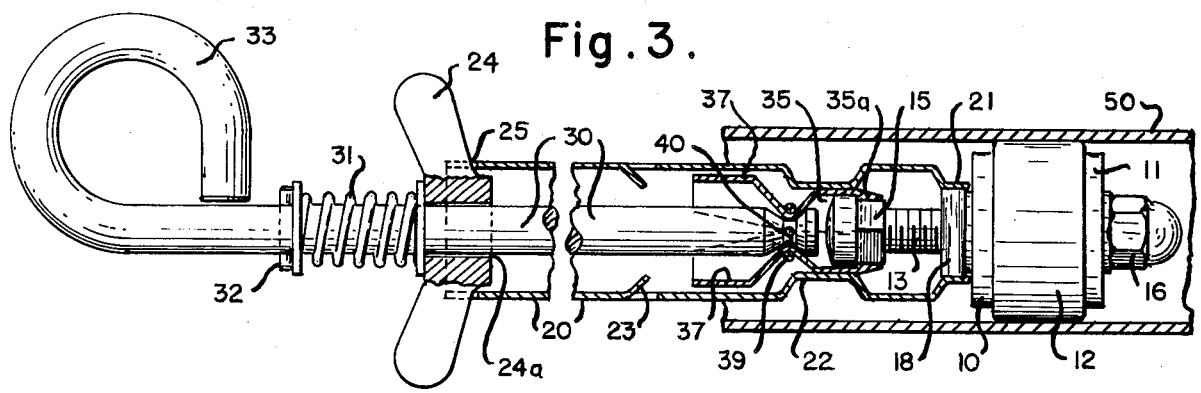
FIG. 3 is a section through the plug assembly and elongated tool in a pipe with the tool in working position.
Figure 4:
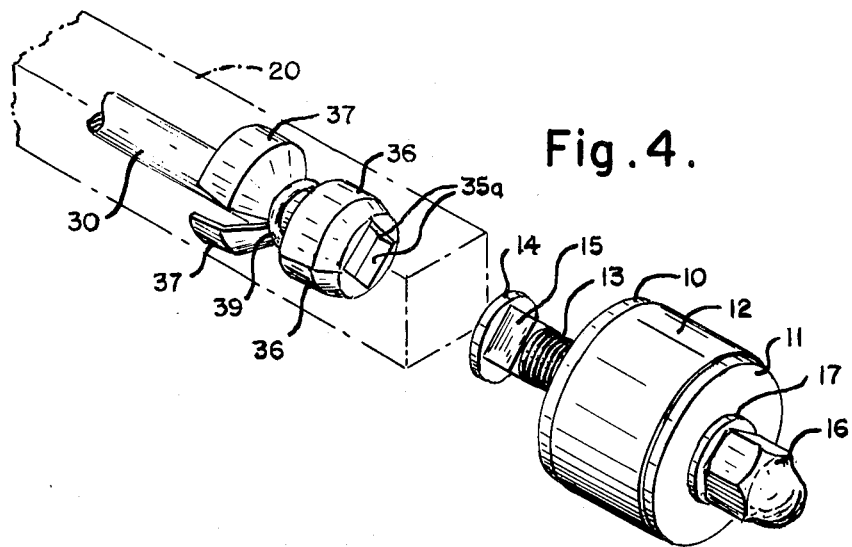
FIG. 4 is an isometric view partly in phantom of a plug and tool of the invention.

A tool for inserting and withdrawing the plug is made up of an outer tube 20 having a nut socket 21 at one end adapted to engage nut 18 of the plug assembly and a grip finger shoe 22 spaced from the nut socket 21. Internal stops in the form of tabs 23 bent down from the wall of tube 20 are provided spaced from shoe 22. The opposite end of tube 20 is provided with a handle in the form of wing nut 24 in slots 25 in the tube. An axially extending rod 30 is centered in tube 20 through opening 24a in wing nut 24 and is urged to the left, viewing FIG. 3, by spring 31 acting against wing nut 24 and pin 32 in rod 30. A handle means 33 is provided on one end of rod 30 for holding or turning rod 30. A groove 34 is provided adjacent the other end of rod 30 opposite handle 33. Grip fingers 35 having grip lands 36 at one end and opening lands 37 at the other end are provided with V-shaped pivot portions 38 between the two sets of lands. The pivot portions 38 rest in groove 34 and are held in place by a retainer such as spring 39 and a drive pin 40 or other suitable means. In operation the rod 30 is pushed into tube 20 against spring 31 until shoe 22 engage the opening lands 37 which pivots the grip fingers 35 to the open position shown in FIG. 2. The grip fingers are placed over the round head 14 of the plug assembly with their down turned ends 35a over lands 15 on head 14. The tube 20 is then moved over the rod until the socket 21 engages nut 18 and shoe 22 engages grip lands 36 forcing the grip finger ends 35a to engage lands 15. The plug assembly is then inserted into a pipe to be sealed to the full length of tube 20. Tube 20 and rod 30 are rotated relative to one another to cause the nut 18 to move along the threaded bolt 13 to the right viewing FIG. 3. This compresses the rubber ring 12 between washers 10 and 11 causing it to expand radially into sealing engagement with the interior of pipe 50. When the ring 12 has been expanded sufficiently to create the desired seal, the tube 20 is moved to the left viewing FIG. 3 which removes socket 21 from nut 18 and brings shoe 22 back onto opening lands 37 on grip fingers 35 causing the grip fingers 35 to pivot in groove 34 and the ends 35a to release and clear bolt head 14. The tool is withdrawn leaving the plug assembly in place. Since the bolt head 14 is round it cannot be engaged by any conventional wrench or tool assembly and thus cannot be removed.

The plug assembly is removed by reversing the steps outlined above for installing the plug.

While certain presently preferred embodiments of this invention have been illustrated and described in this application, it will be obvious that this invention may be otherwise embodied within the scope of the following claims.

I claim:

1. An expandable pipe line plug and tool comprising a flexible stopper plug normally capable of insertion axially into a pipe to be sealed and expansible into sealing engagement with said pipe line, said plug having a pair of spaced bodies movable on a threaded bolt, a deformable sleeve between said bodies being radially expansible on axial pressure by said bodies, stop means on one end of said threaded bolt bearing on one of said bodies, a head on the other end of said threaded bolt having a circular portion and a landed portion within the diameter of the circular portion, said landed portion facing the stop means and shielded from access by the circular portion, nut means threaded on said bolt bearing on the other of said bodies, a removable tool for moving said threaded bolt in said nut, said tool having an outer hollow member having a nut engaging socket at one end adapted to engage the nut of the stopper plug, and an inner member extending axially of the hollow member, gripping means on one end of the inner member within the hollow member movable from an open position adapted to pass around the circular bolt head of the stopper plug to a closed position around said circular bolt head and engaging the landed head portion, and shoe means on the outer hollow member actuating said gripping means from open position to closed position on relative axial movement of the inner member relative to the outer and handle means on each of the inner and outer members whereby they may be rotated relatively to one another to thread the nut of the stopper plug along the threaded bolt thereof to expand and contract the deformable sleeve.

2. An expandable pipe line plug and tool as claimed in claim 1 wherein the landed portion of the head includes four flat planes forming a square beneath the circular head.

3. An expandable pipe line plug and tool as claimed in claim 1 wherein the shoe means are spaced depressions in the outer hollow member.

4. An expandable pipe line plug and tool as claimed in claim 1 wherein the gripping means are a pair of semi-cylindrical members having a pivot line intermediate their ends engaged in a groove in the inner member.

5. An expandable pipe line plug and tool as claimed in claim 2 wherein the gripping means rotate freely beneath the shoe means in both open and closed position.

* * * * *